(12) United States Patent
Nakamura et al.

(10) Patent No.: US 8,277,679 B2
(45) Date of Patent: Oct. 2, 2012

(54) COMPOSITE MAGNETIC MATERIAL AND MAGNETIC ELEMENT

(75) Inventors: Akihiko Nakamura, Tokyo (JP); Keisuke Watanabe, Tokyo (JP)

(73) Assignee: Sumida Corporation, Tokyo (JP)

( * ) Notice: Subject to any disclaimer, the term of this patent is extended or adjusted under 35 U.S.C. 154(b) by 0 days.

(21) Appl. No.: 13/024,675

(22) Filed: Feb. 10, 2011

(65) Prior Publication Data

US 2011/0168939 A1 Jul. 14, 2011

Related U.S. Application Data

(63) Continuation of application No. PCT/JP2010/054828, filed on Mar. 19, 2010.

(30) Foreign Application Priority Data

Apr. 2, 2009 (JP) ................................ 2009-089775

(51) Int. Cl.
*H01F 1/147* (2006.01)

(52) U.S. Cl. ..................... 252/62.55; 148/104; 148/307; 252/62.54

(58) Field of Classification Search .................. None
See application file for complete search history.

(56) References Cited

U.S. PATENT DOCUMENTS

2006/0210832 A1 9/2006 Otsuka

FOREIGN PATENT DOCUMENTS

| JP | 2001-11563 | 1/2001 |
|----|------------|--------|
| JP | 2003-160847 A1 | 6/2003 |
| JP | 2006-261378 A1 | 9/2006 |
| JP | 2008-240041 A1 | 10/2008 |
| JP | 2008-255384 A1 | 10/2008 |

OTHER PUBLICATIONS

International Search Report for International Application No. PCT/JP2010/054828 dated Jun. 7, 2010.

*Primary Examiner* — John Sheehan
(74) *Attorney, Agent, or Firm* — Kratz, Quintos & Hanson, LLP (57) ABSTRACT

The object of the present invention is to provide a composite magnetic material having well-balanced magnetic properties and chemical properties, and a magnetic element using thereof. Concretely, the present provides the composite magnetic material comprising a binder and a magnetic powder contains followings: Mn not less than 0.25 wt % and not larger than 3 wt %, Si not less than 1 wt % and not larger than 7 wt %, Cr not less than 2 wt % and not larger than 8 wt %, and the rest of Fe and inevitable impurities with respect to the total weight of a magnetic powder material, and a ratio of powder particles having the major/minor axis is not less than 2 is not larger than 5% of the total powder particles.

7 Claims, 5 Drawing Sheets

COMPOSITE MAGNETIC MATERIAL AND MAGNETIC ELEMENT

RELATED APPLICATIONS

This is a continuation application of the international patent application No. PCT/JP2010/054828 filed with Application date: Mar. 19, 2010. The present application is based on, and claims priority from, J.P. Application 2009-089775, filed on Apr. 2, 2009, the disclosure of which is hereby incorporated by reference herein its entirety.

BACKGROUND OF THE INVENTION

The present invention relates to a composite magnetic material and a magnetic element. More particularly, it relates to a composite magnetic material containing Mn, Si, Cr, Fe and inevitable impurities as balance at specific ratios and a magnetic element using the composite magnetic material.

BACKGROUND ART

Recently, it is highly demanded for decreasing size and weight but enhancing performance for electronic apparatuses such as a PDA (Personal Digital Assistant). In order to satisfy such demand, a switching power supply should be adapted to a high frequency current. When a switching power supply capable of adapting to the high frequency current is used, magnetic elements such as choke coils and inductors built in the apparatuses are also required to adapt to a high driving frequency.

Incidentally, when the driving frequency of the magnetic elements increases, there is a problem in that joule loss (also referred to as "eddy current loss" or "core loss") due to eddy current increases in the cores of the magnetic elements. On the other hand, it is also necessary to prevent the generation of rust to ensure stable electrical characteristics of the apparatuses.

Japanese Patent Application Laid-open No. 2001-11563 (hereinafter, referred to as "Patent Document 1") proposes a dust core obtained by subjecting a powder magnetic material including an alloy powder containing Fe, Al, and Si as major components and a binder to compression molding and heat treatment in an oxidizing atmosphere.

Japanese Patent Application Laid-open No. 2008-240041 (hereinafter, referred to as "Patent Document 2") proposes a soft magnetic powder containing Fe, Si, and Cr as major components and being produced by an atomizing method and a dust core obtained by subjecting the soft magnetic powder and a binder to compression molding. Among the components of the dust core described in the publication, the content of Cr is in the range greater than 8 wt % and equal to or less than 13 wt %.

[Patent Document 1] Japanese Patent Application Laid-open No. 2001-11563
[Patent Document 2] Japanese Patent Application Laid-open No. 2008-240041

SUMMARY OF THE INVENTION

In the dust core disclosed in Patent Document 1, since the eddy current generated in the core is decoupled between particles, it is excellent in view of a decrease in core loss. However, there is a problem in that the alloy powder is oxidized and rusted, when the ally powder without Cr is exposed to the air for a long period of time. The rust generated causes alteration or deterioration of the binder, thereby increasing the core loss. The increased core loss generates large amount of heat in the dust core, which accelerates either the degeneration or deterioration of the binder. In the smaller size particles, such tendency becomes more obverious.

In Patent Document 2, the relative permeability and the core loss of the dust core are qualitatively evaluated, and its corrosion resistance is evaluated by using a ratio between the initial specific resistance and that after 10 days. The dust core of which the Cr content is in the above-mentioned range showed excellent corrosion resistance, but its quantitative data is not shown.

For the dust core and other magnetic elements are required to have excellent chemical properties such as corrosion resistance. Therefore, there is a social need for a well-balanced composite magnetic material and a magnetic element using thereof.

The invention is made in view of the above-mentioned situation. An object of the invention is to provide a well-balanced composite magnetic material having electrical characteristics, magnetic characteristics, and chemical characteristics, and a magnetic element using thereof.

That is, the present invention provides a composite magnetic material comprising: a magnetic powder comprising Mn not less than 0.25 wt % and not larger than 3 wt %, Si not less than 1 wt % and not larger than 7 wt %, Cr not less than 2 wt % and not larger than 8 wt %, Fe and inevitable impurities as balance with respect to the total weight of a magnetic powder material; and a binder; wherein the magnetic powder contains a powder particle of which a major/minor axis ratio is equal to or greater than 2 is equal to or less than 5% of the total powder particles. Here, the magnetic powder preferably has an average particle size equal to or less than about 50 μm and more preferably equal to or less than about 10 μm. The binder is preferably an epoxy type resin.

The insulation resistivity of the composite magnetic material is preferably equal to or greater than 150 MΩ·cm, and the breakdown electrical field is preferably equal to or greater than 1.6 kV/cm. The core loss is preferably equal to or less than 5 w/cm$^3$, when it is measured under the condition of the magnetic flux density of 50 mT and an effective frequency of 500 kHz. Furthermore, the relative permeability of the composite magnetic material is equal to or greater than 19.

As mentioned above, it is possible to obtain a composite magnetic material with high insulation resistivity, a high breakdown electrical field, and low core loss.

The present invention also provides a magnetic element by using the composite magnetic material, on which a rust through area in the magnetic element is equal to or less than 5% of the surface area of it, when it is maintained in a humidity of 100% atmosphere at 105° C. for 8 hours.

If the rust proof performance of the magnetic element is high, it is possible to produce a magnetic element maintaining stable electrical characteristics for long period without rust in the element.

According to the present invention, it is possible to produce the composite magnetic material with excellent characteristics. By employing the composite magnetic material, it is also possible to produce the magnetic element with excellent corrosion resistance and high performance.

DETAILED DESCRIPTION

Hereinafter, the invention will be described in detail.

A composite magnetic material according to an embodiment of the invention includes a magnetic powder and a binder, wherein the magnetic powder contains Mn not less than 0.25 wt % and not larger than 3 wt %, Si not less than 1 wt % and not larger than 7 wt %, Cr not less than 2 wt % and not larger than 8 wt %, Fe and inevitable impurities as balance with respect to the total weight of a magnetic powder material and a ratio of powder particles of which a major/minor axis ratio is equal to or greater than 2 is equal to or less than 5% of the total powder particles.

Here, since a magnetic material with excellent electrical characteristics is obtained, the content of Mn is preferably in the range of Mn not less than 0.25 wt % and not larger than 3 wt % with respect to the total weight of the magnetic powder material, and more preferably in the range of not less than 0.4 wt % and not larger than 1 wt %. When the content of Mn is less than 0.25 wt %, the following problem exists. That is, since the ratio of particles of which the major/minor axis ratio is equal to or greater than 2 is high, the insulation resistivity and the dielectric breakdown electric field are low and the core loss increases. In addition, wire damage occurs at the time of forming a product. In contrast, when the content of Mn is greater than 3 wt %, the following problem exists. That is, the insulation resistivity and the dielectric breakdown electric field do not increase greatly and the core loss is not improved greatly, but the relative permeability is largely decreased.

Since a magnetic material with excellent magnetic characteristics is obtained, the content of Si is preferably in the range of not less than 1 wt % and not larger than 7 wt % with respect to the total weight of the magnetic powder material and more preferably in the range of not less than 3 wt % and not larger than 5 wt %. When the content of Si is less than 1 wt %, the core loss is great. When the content of Si is greater than 7 wt %, the core loss is high and the relative permeability is lowered greatly.

Since the magnetic material with excellent chemical characteristics is obtained, the content of Cr is preferably in the range of not less than 2 wt % and not larger than 8 wt % with respect to the total weight of the magnetic powder material and more preferably in the range of not less than 3 wt % and not larger than 5 wt %. When the content of Cr is less than 2 wt %, satisfactory corrosion resistance is not obtained. When the content of Cr is greater than 8 wt %, the relative permeability is largely decreased.

The ratio of powder particles of which the major/minor axis ratio is equal to or greater than 2 in the composite magnetic material is preferably not larger than 5% of the total powder particles. By decreasing the ratio of the powder particles having such a major/minor axis ratio, the properties of the composite magnetic material are improved such that both of the insulation resistivity and the dielectric breakdown electric field increase and the core loss decreases.

Since an epoxy resin has small cure shrinkage and excellent adhesion, heat resistance, and electrical properties, the epoxy type resin can be suitably used as the binder. The amount of the binder to be added is preferably in the range between about 2 and 5 wt % of the entire weight of the composite magnetic material, from the view point of securing relative permeability or core loss to be needed.

In the composite magnetic material, the insulation resistivity is not less than 150 MΩ·cm, from the viewpoint of the suppression of the eddy current loss (core loss). It is more preferably not less than 160 MΩ·cm.

The dielectric breakdown electric field is preferably not less than 1.6 kV/cm, because a satisfactory withstanding voltage of the magnetic element is secured; and more preferably not less than 2.6 kV/cm.

The core loss of the composite magnetic material has preferably not larger than 5 w/cm$^3$, when it is measured at a magnetic flux density of 50 mT and an effective frequency of 500 kHz; because it suppresses the heat generation of the magnetic element. More preferably, it is not larger than 4.5 w/cm$^3$.

The average particle size of the magnetic powder particles (alloy powder particles) used in the composite magnetic material is preferably in the range of 5 μm to 6 μm, because it suppresses the core loss. Note that the particle with the average particle size not larger than 10 μm shows almost the same advantageous effect.

The present invention also provides a magnetic element by using the composite magnetic material having the above-mentioned properties. The production of the composite magnetic material and the composite magnetic element according to the present invention will be described with reference to FIGS. 1A and 1B, where it is exemplified that the composite magnetic material having the composition shown in Table 1 is used.

TABLE 1

| Composite Magnetic Material | Composition of Alloy Powder | Compounding Ratio (wt %) |
|---|---|---|
| Alloy Powder Particles | Mn | 0.8 |
|  | Si | 4 |
|  | Cr | 4 |
|  | Fe | Rest |
|  | Sub Total | 100 |
| Epoxy Resin | — | 3.5 |

Alloy powder particles having the composition shown in Table 1 are produced by using any desired methods such as a water atomization and the like. The shapes of the alloy powder particles produced are observed by using a scanning electron microscope to obtain the ratio of major/minor axis ratio of them.

By spraying the binder to the alloy powder particles, the composite magnetic material is obtained, wherein the surfaces of the alloy powder are coated with the epoxy resin.

The magnetic element with desired thickness and size is produced as follows. The size of the magnetic element may be, for example, 6 to 15 mm×6 to 15 mm, and the thickness of it may be, for example, 2 to 6 mm.

Figure 1A:
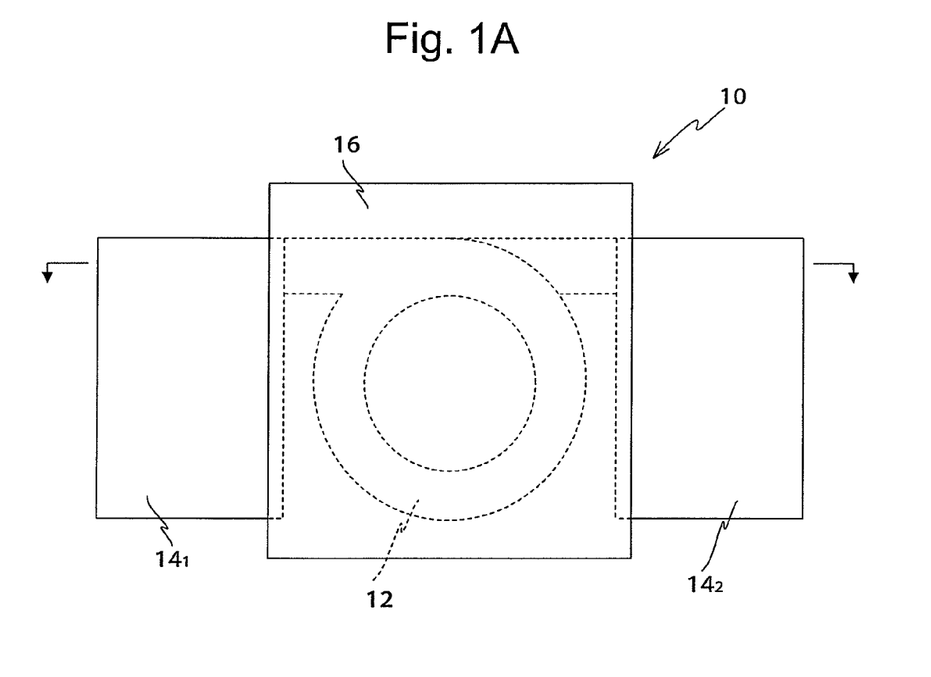
FIG. 1A is a front view of a composite magnetic element (before completion) which is taken out from a powder molding machine.
Figure 1B:
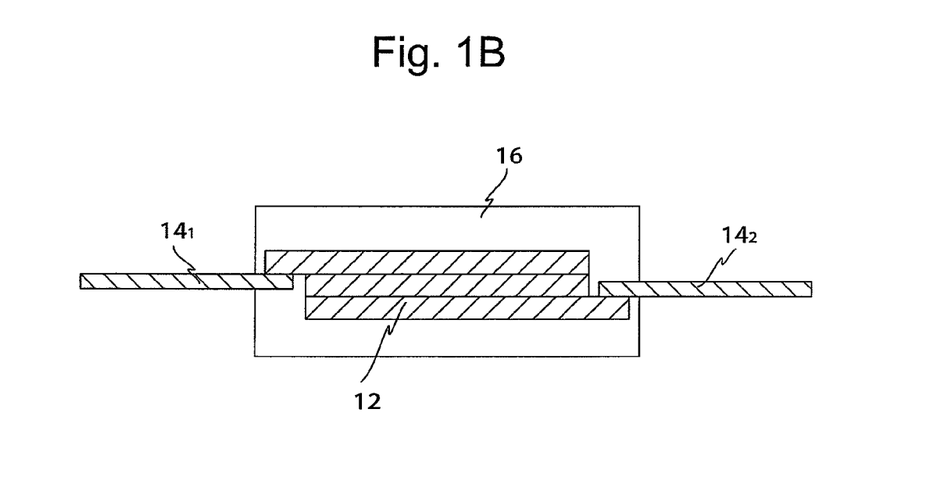
FIG. 1B is a sectional view of the composite magnetic element shown in FIG. 1A.

In the composite magnetic element according to the invention, a copper wire in a coiled form is molded with the composite magnetic material (see FIGS. 1A and 1B). The copper wire diameter, the coil inner diameter, and the winding number of the coil 12 are determined depending on required product characteristics.

The copper wire used here may be either a rectangular wire or regular wire. Next, a thin copper plate with a desired size plated with Sn is prepared as external terminals $14_1$ and $14_2$. Each end of the coil 12 is welded to each of the external terminals $14_1$ and $14_2$ to form an external-terminal-attached coil. The ends of the coil are connected to the external terminals by spot welding. The welding may be carried out using any methods other than the spot welding, such as arc welding, ultrasonic welding, diffusion welding, and soldering.

The composite magnetic material shown in Table 1 and the external-terminal-attached coil are placed into a mold of a powder molding machine and molded with a desired molding pressure of, for example, 2 to 6 ton/cm$^2$. Thereafter, the molded body is taken out from the molding machine and is heated at a desired temperature of, for example, about 100° C. to 200° C. for about 30 to 90 minutes to cure the resin.

Figure 2A:
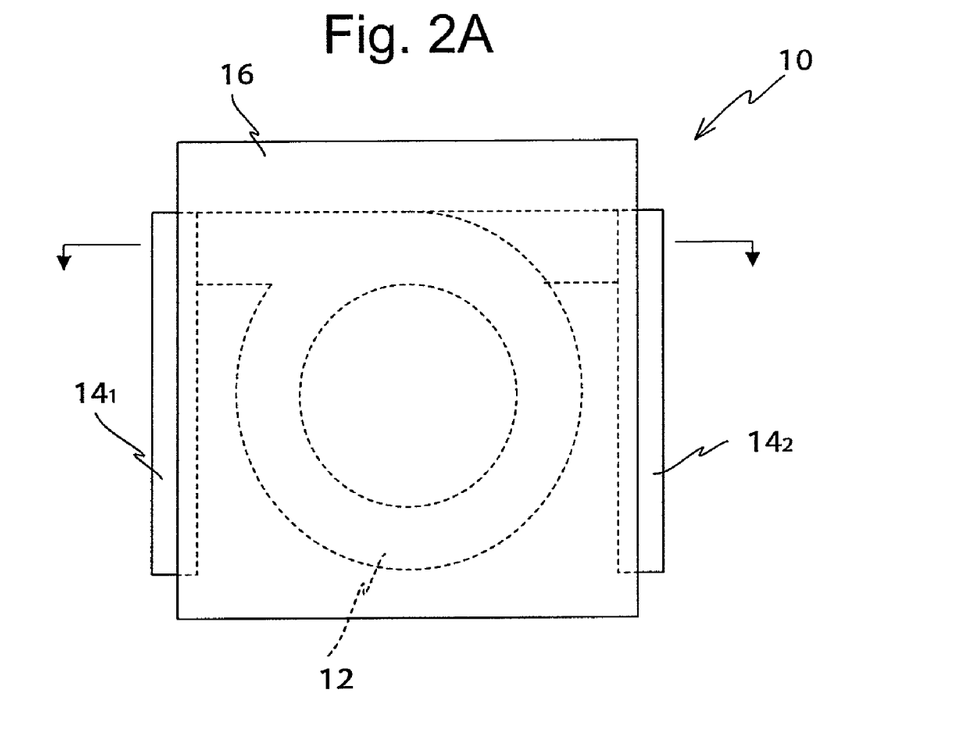
FIG. 2A is a front view of a completed composite magnetic element.
Figure 2B:
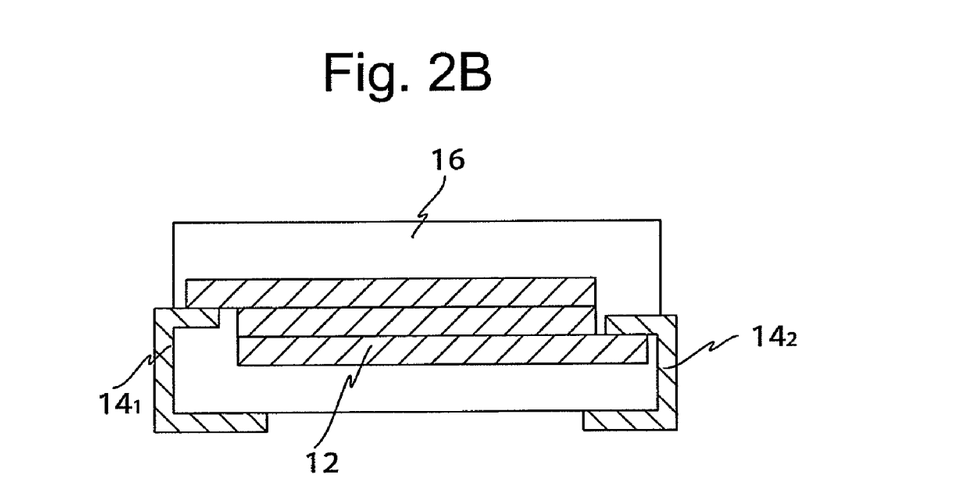
FIG. 2B is a sectional view of the composite magnetic element shown in FIG. 2A.
Figure 3:
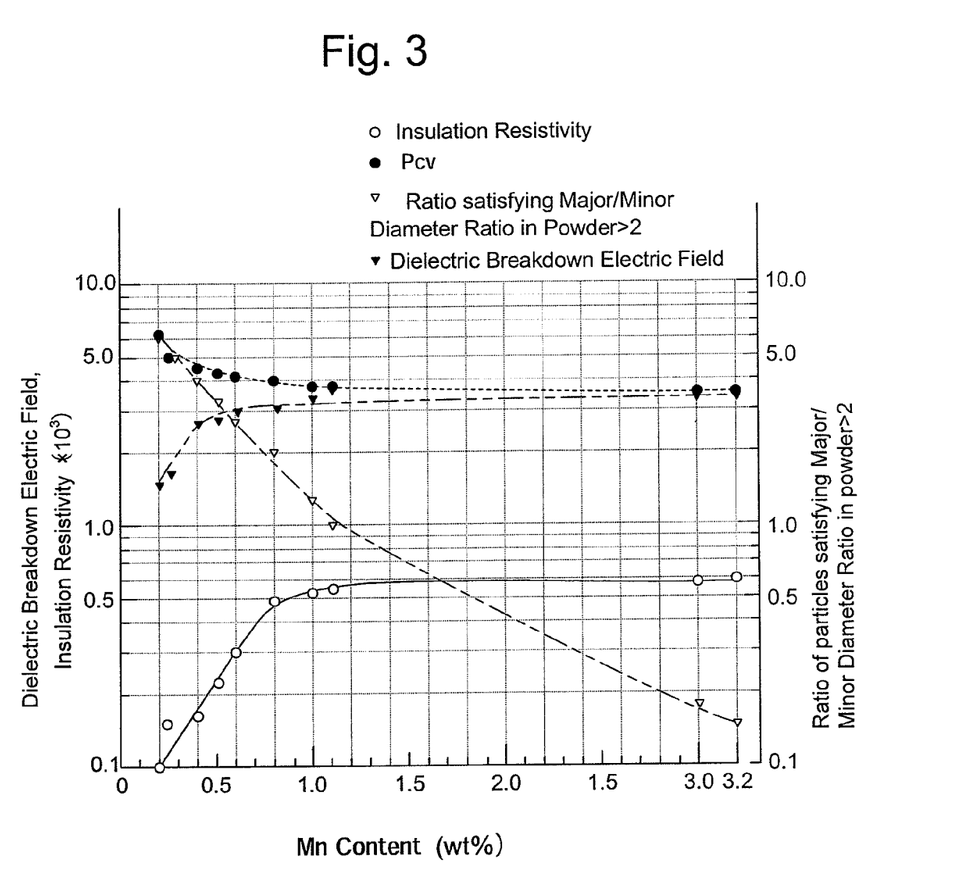
FIG. 3 is a graph illustrating a ratio of particles satisfying major/minor axis ratio<2, insulation resistivity, dielectric breakdown electric field, and relations between Pcv and Mn content according to Examples 1 to 8 and Comparative Examples 1 and 2.
Figure 4:
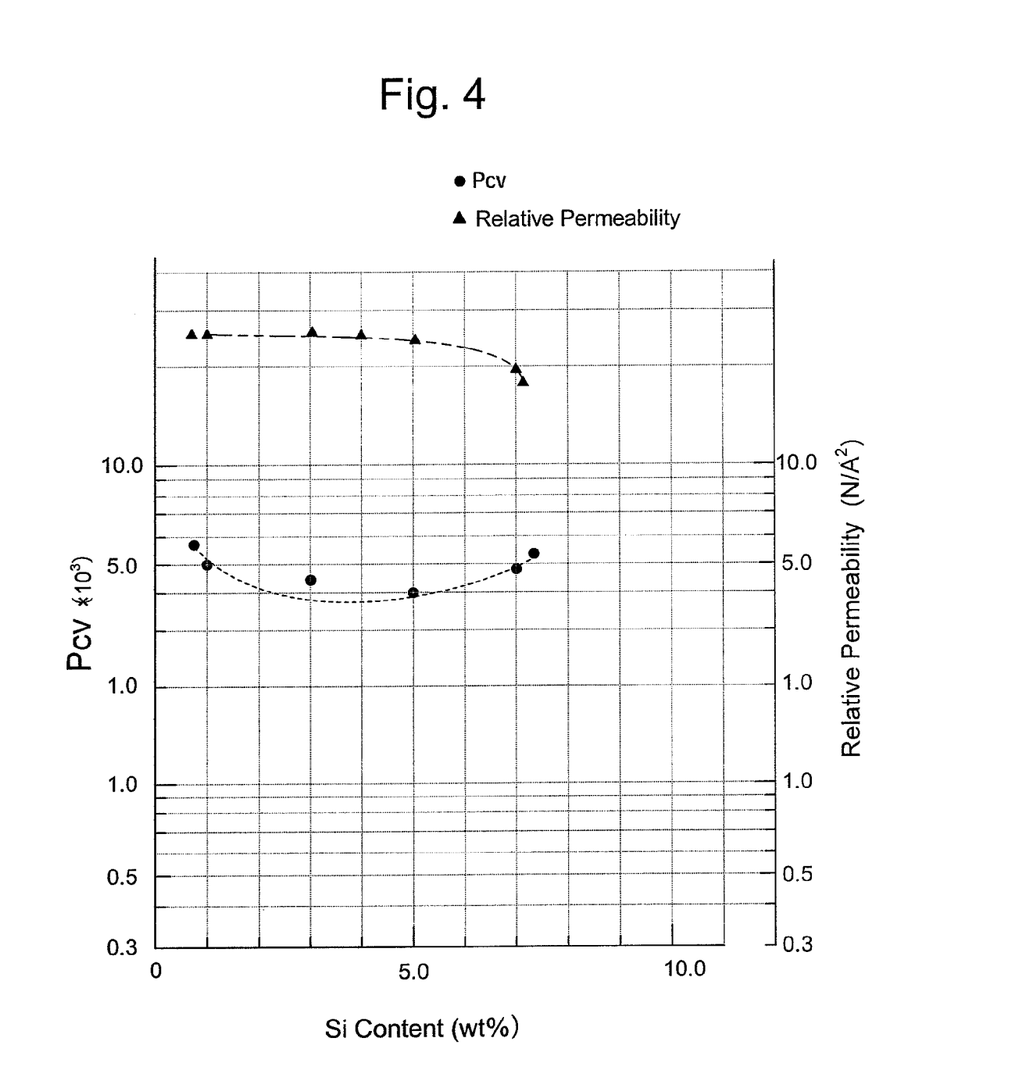
FIG. 4 is a graph illustrating relative permeability and relations between Pcv and Si content according to Examples 9 to 13 and Comparative Examples 3 and 4.
Figure 5:
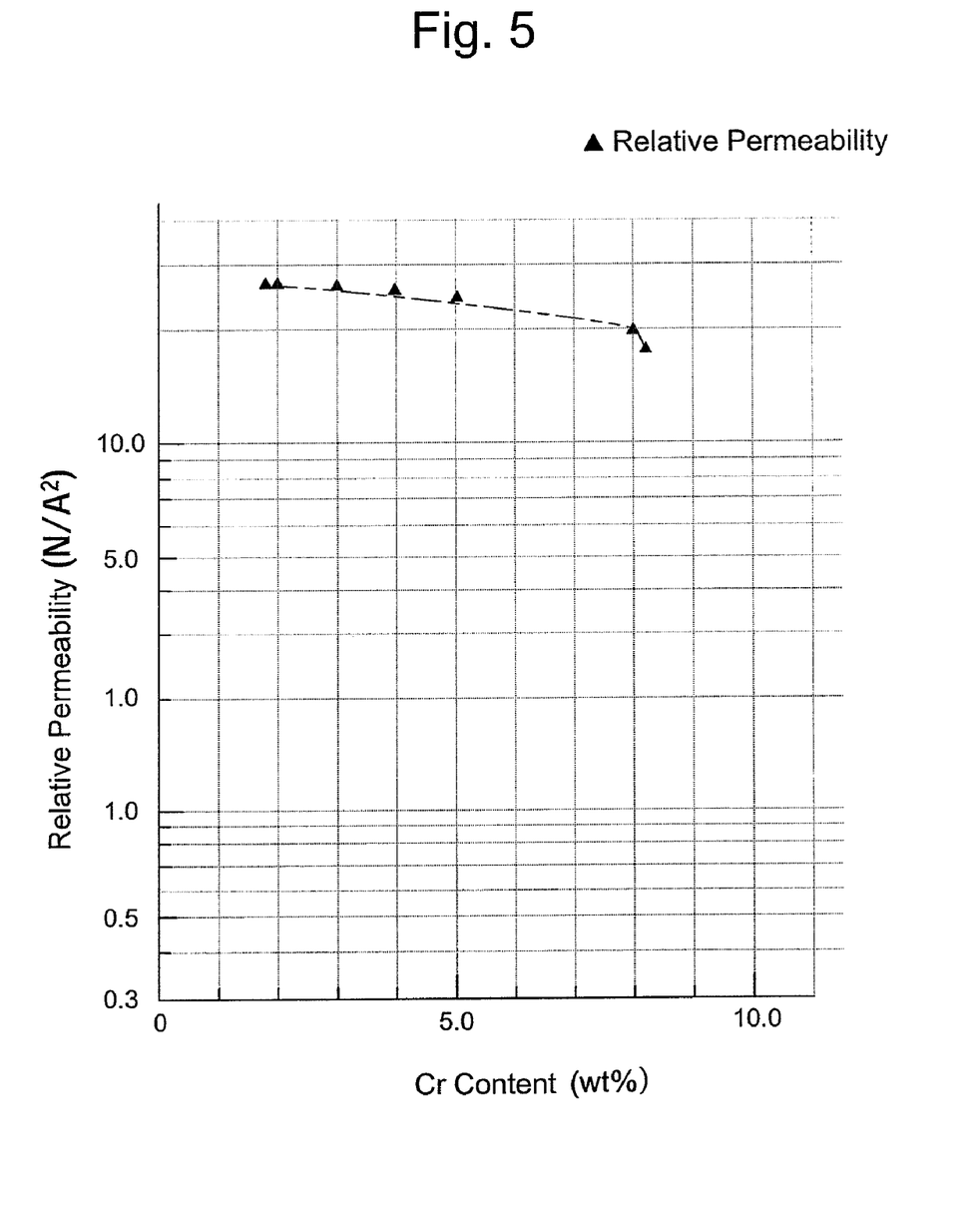
FIG. 5 is a graph illustrating relations between relative permeability and Cr content according to Examples 14 to 18 and Comparative Examples 5 and 6.

The resultant molded body is allowed to cool (see FIGS. 1A and 1B), and both of the terminals $14_1$ and $14_2$ are bent along the outer edge of the molded body of the magnetic powder to obtain a magnetic element (see FIGS. 2A and 2B).

EXAMPLES

Hereinafter, the present invention will be described in detail with reference to examples, but it is not limited to the examples.

Example 1

Study of Mn Content (1) Production of Magnetic Material

Shape variation of the particle based on the content of Mn under the certain amount of Si and Cr was observed with a scanning electron microscope, and the ratio of powder particles of which the major/minor axis ratio is equal to or greater than 2 and the average particle size were calculated. The content of Mn was set to those shown in Table 2 and particles were produced using a widely-known water atomizing method. The produced powder with an average particle size equal to or less than 10 μm was used.

TABLE 2

| Mn Content (wt %) | Ratio of Particles with Major/minor axis Ratio of 2 or more (%) | Average Particle Size (μm) |
|---|---|---|
| 0.2 | 6 | 5.5 |
| 0.25 | 5 | 5.4 |
| 0.4 | 3.9 | 5.7 |
| 0.5 | 3.3 | 5.5 |
| 0.6 | 2.7 | 5.7 |
| 0.8 | 2 | 5.5 |
| 1 | 1.3 | 5.6 |
| 1.1 | 1 | 5.7 |
| 3 | 0.18 | 5.5 |
| 3.2 | 0.15 | 5.5 |

As shown in Table 2, as the content of Mn increases, it was observed that the ratio of particles of which the major/minor axis ratio is not less than 2 decreases and the average particle size is not changed drastically.

The following composite magnetic powders were produced by using alloy powders with an average particle size shown in Table 2.

The alloy powders with compositions shown in Table 3 were produced using the water atomizing method. Next, by atomizing the binder (epoxy type resin) to the alloy powders, the composite magnetic materials composed of the alloy powder of which surfaces are coated with the epoxy type resin were obtained.

Molded bodies were obtained from the resultant composite magnetic powders under the following molding conditions.

[Molding Conditions]
Molding method: compression molding
Molded body shape: toroidal core
  disc-formed core
Molded body size: the toroidal core with outer diameter of 15 mm, inner diameter of 10 mm, and thickness of 2.5 mm
  disc-formed core with outer diameter of 10 mm and thickness of 0.6 mm
Molding pressure: 4 ton/cm$^2$ The toroidal core was used to measure the relative permeability and the core loss.

The disc-formed core was used to measure both of the insulation resistivity and the dielectric breakdown electric field, and to observe the rust generation.

The molded bodies were heated in the atmosphere at 100° C. for 1 hour to cure the binder, thereby obtaining dust cores.

(2) Study of Properties of Dust Core

Property measurement items of a dust cores produced by using the magnetic powders according to Examples 1 to 8 and Comparative Example 1 and 2 were set to the insulation resistivity (MΩ·cm), the dielectric breakdown electric field (kV/cm), the relative permeability, and Pcv (w/cm$^3$) and were evaluated. The measurement conditions and the evaluation criteria of the properties are described below.

(a) Insulation Resistivity (MΩ·cm): A voltage of 60 V is applied to the top and bottom surfaces of the disc-formed core, and the electric resistance was measured to obtain the insulation resistivity, taking into account thickness of the specimen. As shown in Table 3, the satisfactory insulation resistivity was obtained, when the Mn content was equal to or greater than 0.25 wt %.

(b) Dielectric Breakdown Electric Field (kV/cm): A voltage applied to the top and bottom surfaces of the disc-formed core was measured to obtain the voltage at which the electric resistance is rapidly lowered. The value of the voltage was defined as the dielectric breakdown electric field. The satisfactory dielectric breakdown electric field was obtained with the content of Mn equal to or greater than 0.25 wt %.

(c) Relative permeability: The inductance of the toroidal core was measured at a frequency of 1 MHz by using an LCR meter. The relative permeability was obtained from the core constant of the toroidal core. The relative permeability ($\mu_r$) was calculated by the following equation.

$$(\mu_r) = (Ls \times le)/(\mu_0 \times Ae \times N^2)$$

Here, Ls represents the inductance (H), le represents the length of a magnetic path (m), Ae represents the cross-sectional area (m$^2$), $\mu_0$ represents the permeability in vacuum (H/m), and N represents the number of turns of the coil.

As mentioned above, the satisfactory specific permeability was obtained with the content of Mn equal to or less than 3.0 wt %.

(d) Core Loss (Pcv: w/cm$^3$): The toroidal core was measured under the conditions of Bm=50 mT and f (effective frequency)=500 kHz by using an AC B-H curve meter. The satisfactory core loss could be obtained with the content of Mn equal to or less than 0.25 wt %.

TABLE 3

| | | Alloy Composition | | | Ratio of Particles with Major/minor Diameter Ratio of 2 or more*1 | | Insulation Resistivity*2 | | Dielectric Breakdown Electric Field*3 | | Relative Permeability*4 | | Pcv*5 | |
|---|---|---|---|---|---|---|---|---|---|---|---|---|---|---|
| | Mn | Si | Cr | Fe | (%) | Evaluation | (MΩ·cm) | Evaluation | (kV/cm) | Evaluation | $\mu_r$ | Evaluation | (w/cm³) | Evaluation |
| Comparative Example 1 | 0.2 | 4 | 4 | Balance | 6 | C | 100 | C | 1.5 | C | 26 | A | 6.2 | C |
| Examples 1 | 0.25 | 4 | 4 | Balance | 5 | A | 150 | B | 1.6 | A | 25.5 | A | 5 | A |
| 2 | 0.4 | 4 | 4 | Balance | 3.9 | A | 160 | A | 2.6 | A | 25.5 | A | 4.5 | A |
| 3 | 0.5 | 4 | 4 | Balance | 3.3 | A | 220 | A | 2.8 | A | 25.4 | A | 4.3 | A |
| 4 | 0.6 | 4 | 4 | Balance | 2.7 | A | 300 | A | 3 | A | 25.3 | A | 4.2 | A |
| 5 | 0.8 | 4 | 4 | Balance | 2 | A | 480 | A | 3.1 | A | 25 | A | 4 | A |
| 6 | 1 | 4 | 4 | Balance | 1.3 | A | 520 | A | 3.5 | A | 24 | A | 3.8 | A |
| 7 | 1.1 | 4 | 4 | Balance | 1 | A | 540 | A | 3.6 | A | 23.5 | A | 3.8 | A |
| 8 | 3 | 4 | 4 | Balance | 0.18 | A | 580 | A | 3.7 | A | 19 | B | 3.6 | A |
| Comparative Example 2 | 3.2 | 4 | 4 | Balance | 0.15 | A | 585 | A | 3.7 | A | 18 | C | 3.6 | A |

*1 The particle ratio equal to or less than 5% was evaluated as A and the particle ratio greater than 5% was evaluated as C.
*2 The insulation resistivity greater than 150 (MΩ·cm) was evaluated as A, the insulation resistivity of 150 (MΩ·cm) was evaluated as B, and the insulation resistivity less than 150 (MΩ·cm) was evaluated as C.
*3 The dielectric breakdown electric field greater than 1.5 (kV/cm) was evaluated as A and the dielectric breakdown electric field equal to or less than 1.5 (kV/cm) was evaluated as C.
*4 The relative permeability greater than 19.0 was evaluated as A, the relative permeability of 19.0 was evaluated as B, and the relative permeability less than 19.0 was evaluated as C.
*5 The measuring conditions of Pcv were set to Bm = 50 mT and f = 500 kHz.
*6 The Pcv equal to or less than 5.0 (w/cm³) was evaluated as A and the Pcv greater than 5.0 (w/cm³) was evaluated as C.

The dust core of Comparative Example 1 showed lower insulation resistivity and the dielectric breakdown electric field, but higher the core loss among the above-mentioned measurement items. The dust core of Comparative Example 2 showed lower relative permeability.

In contrast, the dust cores of Examples 1 to 8 showed higher relative permeability and lower core loss. They were evaluated with well-balanced.

As a result, the content of Mn was set to the range between 0.25 wt % to 3 wt %.

Example 2

Study of Content of Si

The dust cores having the compositions shown in Table 4 were produced and their properties were evaluated by using the relative permeability and the core loss. The measurement conditions of the core loss were the same as those of Example 1. The results are shown in Table 4.

TABLE 4

| | Alloy Composition | | | | Relative Permeability | | Pcv*2 | |
|---|---|---|---|---|---|---|---|---|
| | Mn | Si | Cr | Fe | $\mu_r$ | Evaluation*1 | (w/cm³) | Evaluation*3 |
| Comparative Example 3 | 0.8 | 0.8 | 4 | Balance | 26.4 | A | 5.5 | C |
| Examples 9 | 0.8 | 1 | 4 | Balance | 26.4 | A | 5 | A |
| 10 | 0.8 | 3 | 4 | Balance | 26 | A | 4.4 | A |
| 11 | 0.8 | 4 | 4 | Balance | 25 | A | 4.2 | A |
| 12 | 0.8 | 5 | 4 | Balance | 23.9 | A | 4 | A |
| 13 | 0.8 | 7 | 4 | Balance | 20 | A | 4.8 | A |
| Comparative Example 4 | 0.8 | 7.2 | 4 | Balance | 18 | C | 5.1 | C |

*1 The relative permeability greater than 19.0 was evaluated as A and the relative permeability less than 19.0 was evaluated as C.
*2 The measuring conditions of Pcv were set to Bm-50 mT and f = 500 kHz.
*3 The core loss equal to or less than 5.0 (w/cm³) was evaluated as A and the core loss greater than 5.0 (w/cm³) was evaluated as C.

Both of the dust core of Comparative Example 3 of which Si content is low, 0.8 wt %, and that of Comparative Example 4 of which Si content is high, 7.2 wt %, showed the core loss greater than 5.0 w/cm³. The dust core of Comparative Example 4 showed lower relative permeability.

In contrast, the dust cores of Examples 9 to 13 showed good properties.

Example 3

Study of Content of Cr

The dust cores having the compositions shown in Table 5 were produced and their properties were evaluated by using the relative permeability and the rust generation. The dust cores used to evaluate the rust generation in the example were subjected to an antirust treatment. After that, the rust generation was observed and evaluated with the naked eye. An inorganic antirust aqueous solution containing boron oxide and sodium oxide was used in the antirust treatment.

TABLE 5

| | | Alloy Composition | | | Relative permeability*1 | Corrosion*2 |
| | Mn | Si | Cr | Fe | μ_r | Evaluation | Evaluation |
|---|---|---|---|---|---|---|---|
| Comparative Example 5 | 0.8 | 0.8 | 1.8 | Rest | 26.5 | A | C |
| Examples 14 | 0.8 | 1 | 2 | Rest | 26.5 | A | B |
| 15 | 0.8 | 3 | 3 | Rest | 26.1 | A | A |
| 16 | 0.8 | 4 | 4 | Rest | 25 | A | A |
| 17 | 0.8 | 5 | 5 | Rest | 23.8 | A | A |
| 18 | 0.8 | 7 | 8 | Rest | 20.5 | A | A |
| Comparative Example 6 | 0.8 | 7.2 | 8.2 | Rest | 18.3 | C | A |

*1The relative permeability greater than 19.0 was evaluated as A and the relative permeability less than 19.0 was evaluated as C.
*2No rust was evaluated as A, the rust-generated area less than 5% was evaluated as B, and the rust-generated area equal to or greater than 5% was evaluated as C.

The inorganic antirust solution was introduced into a closed glass vessel, and the dust cores produced for the present example were immersed in it for 5 minutes under a reduced pressure. After that, the dust cores were taken out from the solution and dried at 140° C. for 60 minutes.

The dust cores antirust-treated as mentioned above were held for 8 hours in a humidistat, at 105° C. and a humidity of 100% atmosphere. The rust generation on the surfaces of the magnetic elements of Examples 14 to 18 and Comparative Examples 5 and 6 was observed.

Regarding the rust generation, the allowable limit was set to 5% of both the surface areas of the dust core. The dust core having no rust generation was evaluated as A, that having the rust-generated area less than 5% was evaluated as B, and that having the rust-generated area equal to or greater than 5% was evaluated as C.

The dust core having Cr content of 1.8 wt % of Comparative Example 5 had a wide range covered by the rust. The dust core having Cr content of 7.2 wt % of Comparative Example 6 showed the sharp decline of the relative permeability.

In contrast, the dust cores of Examples 14 to 18 did not show large decrease of the relative permeability, and their rust generation was less than 5%.

As a result, the content of Cr was set to the range between 2 wt % to 8 wt %.

Example 4

Study of Inductance and Core Loss

The magnetic elements having the compositions shown in Table 6 were produced and their inductance and the core loss were measured. The inductance was measured at an effective frequency (f) of 1 MHz. The core loss was measured under the conditions of a flux density of 25 mT and the effective frequency of 500 kHz. The results are shown in Table 6.

TABLE 6

| | Type | | | | | | |
| | Alloy Composition (wt %) | | | | Content of resin | Inductance | Core Loss |
| | Mn | Cr | Si | Fe | (wt %) | (μH)*2 | (w/cm³)*3 |
|---|---|---|---|---|---|---|---|
| Comparative Example 7 | 0.07 | 4 | 4 | Rest | 3.5 | 0.55 | 0.7 |
| Example 19 | 0.8 | 4 | 4 | Rest | 3.5 | 0.55 | 0.56 |

*1Epoxy resin
*2Inductance measuring condition: f = 1 MHz
*3Core loss measuring condition: Bm = 25 mT and f = 500 Hz They have no difference in the inductance, but the magnetic element of the example showed about 20% smaller core loss.

As a result, it was demonstrated that the composite magnetic material comprising a magnetic powder contains Mn not less than 0.25 wt % and not larger than 3 wt %, Si not less than 1 wt % and not larger than 7 wt %, Cr not less than 2 wt % and not larger than 8 wt %, Fe and inevitable impurities as balance with respect to the total weight of a magnetic powder material, and a ratio of powder particles having the major/minor axis is not less than 2 is not larger than 5% of the total powder particles, was excellent in various characteristics as mentioned above.

The invention is useful for downsizing, weight saving electronic apparatuses such as a PDA and offering high performance to them.

What is claimed is:

1. A composite magnetic material comprising:
   a magnetic powder comprising Mn not less than 1.1 wt % and not larger than 3 wt %, Si not less than 4 wt % and not larger than 7 wt %, Cr not less than 4 wt % and not larger than 8 wt %, Fe and inevitable impurities as balance with respect to the total weight of a magnetic powder material; and a binder;
   wherein the fraction of the total powder particles of the magnetic powder having a major/minor axis ratio of equal to or greater than 2 is equal to or less than 1%.

2. The composite magnetic material according to claim 1, wherein the insulation resistivity is equal to or greater than 150 MΩcm.

3. The composite magnetic material according to claim 1, wherein the dielectric breakdown electric field is equal to or greater than 1.6 kV/cm.

4. The composite magnetic material according to claim 1, wherein the core loss at a magnetic flux density of 50 mT and an effective frequency of 500 kHz is equal to or less than 5 w/cm³.

5. The composite magnetic material according to claim 1, wherein the content of the binder is in the range of 2.5 to 4.5 wt % of the composite magnetic material.

6. A magnetic element formed of the composite magnetic material according to any one of claims 1 to 5.

7. The magnetic element according to claim 6, wherein an area of corrosion in the magnetic element having been maintained in the atmosphere of a temperature of 105° C. and a humidity of 100% for 8 hours is equal to or less than 5% of the surface area of the magnetic material.

* * * * *